United States Patent
Chen

(10) Patent No.: US 9,351,160 B2
(45) Date of Patent: May 24, 2016

(54) BASE STATION AND METHOD IN RELAY NODE MOBILITY

(75) Inventor: Peng Chen, Jiangsu (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 54 days.

(21) Appl. No.: 14/399,939

(22) PCT Filed: May 7, 2012

(86) PCT No.: PCT/CN2012/075114
§ 371 (c)(1),
(2), (4) Date: Nov. 7, 2014

(87) PCT Pub. No.: WO2013/166637
PCT Pub. Date: Nov. 14, 2013

(65) Prior Publication Data
US 2015/0094025 A1     Apr. 2, 2015

(51) Int. Cl.
*H04M 1/66* (2006.01)
*H04M 1/68* (2006.01)
(Continued)

(52) U.S. Cl.
CPC .......... *H04W 12/04* (2013.01); *H04W 36/0038* (2013.01); *H04W 36/08* (2013.01); *H04W 84/047* (2013.01); *H04W 88/08* (2013.01)

(58) Field of Classification Search
CPC ... H04W 36/08; H04W 84/047; H04W 88/08; H04W 12/04; H04W 36/008
USPC .................... 455/411, 436, 439, 561
See application file for complete search history.

(56) References Cited

U.S. PATENT DOCUMENTS

| 8,396,479 B2* | 3/2013 | Zhang | H04B 7/155 455/436 |
| 8,730,918 B2* | 5/2014 | Huang | H04W 36/12 370/331 |

(Continued)

FOREIGN PATENT DOCUMENTS

| CN | 101772100 A | 7/2010 |
| CN | 102316451 A | 1/2012 |

(Continued)

OTHER PUBLICATIONS

Extended European Search Report, EP Application No. 12876218.4, dated Nov. 3, 2015, 6 pages.

(Continued)

*Primary Examiner* — Marceau Milord
(74) *Attorney, Agent, or Firm* — NDWE LLP

(57) ABSTRACT

The present disclosure relates to a base station and a method for security key synchronization during relay node (RN) mobility. In one embodiment, the base station may include a first transceiver configured to receive a Next Hop Chaining Counter in use, $NCC_{in\_use}$, sent from a source base station; a security key synchronization determining unit configured to determine that a security key synchronization criteria as follows is met: $NCC_{latest} - NCC_{in\_use} >$ Threshold, wherein $NCC_{latest}$ denotes a Next Hop Chaining Counter corresponding to the last Next Hop (NH) received from evolved packet core (EPC) for the user equipment (UE), and Threshold is a predetermined threshold; a second transceiver configured to send a security key update request to a relay node serving the UE, and to receive a security key update response from the relay node serving the UE; and a security key updater configured to update the $NCC_{in\_use}$ as the $NCC_{latest}$.

8 Claims, 3 Drawing Sheets

(51) Int. Cl.
*H04M 3/16* (2006.01)
*H04W 12/04* (2009.01)
*H04W 36/00* (2009.01)
*H04W 36/08* (2009.01)
*H04W 88/08* (2009.01)
*H04W 84/04* (2009.01)

(56) References Cited

U.S. PATENT DOCUMENTS

| | | | | |
|---|---|---|---|---|
| 8,781,477 | B2 * | 7/2014 | Zhang | H04W 36/0005 455/439 |
| 8,855,069 | B2 * | 10/2014 | Lohr | H04L 1/1887 370/328 |
| 8,937,071 | B2 * | 1/2015 | Eidam | C07D 213/69 514/253.12 |
| 9,049,744 | B2 * | 6/2015 | Waldhauser | H04W 36/0055 |
| 9,072,013 | B2 * | 6/2015 | Zhang | |
| 9,131,495 | B2 * | 9/2015 | Teyeb | H04W 36/0011 |
| 9,253,708 | B2 * | 2/2016 | Takahashi | H04W 40/36 |
| 9,258,745 | B2 * | 2/2016 | Yu | H04W 36/00 |
| 2011/0274086 | A1 | 11/2011 | Xu | |
| 2012/0071190 | A1 * | 3/2012 | Choi | H04L 5/0037 455/517 |
| 2012/0082084 | A1 * | 4/2012 | Balakrishnan | H04W 72/1215 370/315 |
| 2012/0164979 | A1 * | 6/2012 | Bachmann | H04L 63/164 455/411 |

FOREIGN PATENT DOCUMENTS

| | | |
|---|---|---|
| CN | 102340774 A | 2/2012 |
| EP | 2271144 A1 | 1/2011 |
| WO | 2011160059 A1 | 12/2011 |

OTHER PUBLICATIONS

3GPP TSG-RAN WG3 Meeting #75, R3-120161, "Discussion on Mobile Relay Architecture and Group Mobility," Dresden, Germany, Feb. 6-10, 2012, 3 pages, China Unicorn.

International Preliminary Report on Patentability for PCT Application No. PCT/CN2012/075114; dated Nov. 11, 2014; 4pgs.

3GPP; Technical Specification Group Services and System Aspects; 3GPP System Architecture Evolution (SAE): Security architecture; (Release 9) 3GPP TS 33.401 V9.2.0 (Dec. 2009); 104pgs.

3GPP; Technical Specification Group Services and System Aspects; 3GPP System Architecture Evolution (SAE): Security architecture; (Release 11) 3GPP TS 33.401 V11.3.0 (Mar. 2012); 120pgs.

3GPP TSG RAN#52; RP-110894; Source: CATT, CMCC, CATR, China Telecom; Title: 'New Study Item Proposal: Mobile Relay for E-UTRA,' agenda item: 13.2; Bratislava, Slovakia, May 31-Jun. 3, 2011; 6 pgs.

3GPP; Technical Specification, LTE; Evolved Universal Terrestrial Radio Access (E-UTRA); Radio Resource Control (RRC); Protocol specification; (3GPP TS 36.331 version 9.10.0 Release 9) Mar. 2012; 259pgs.

3GPP; Technical Specification Group Radio Access Network; Evolved Universal Terrestrial Radio Access (E-UTRA); Radio Resource Control (RRC); Protocol specification (Release 9); 3GPP TS 36.331 V9.18.0; Jun. 2014; 265pgs.

3GPP; Technical Specification Group Radio Access Network; Evolved Universal Terrestrial Radio Access (E-UTRA); Relay architectures for E-UTRA (LTE-Advanced); (Release 9); 3GPP TR 36.806 V9.0.0 (Mar. 2010), 34pgs.

PCT International Search Report and Written Opinion of the International Searching Authority for PCT Application No. PCT/CN2012/075114; mailed Feb. 28, 2013; 9pgs.

* cited by examiner

BASE STATION AND METHOD IN RELAY NODE MOBILITY

CROSS-REFERENCE TO RELATED APPLICATIONS

This application is a National stage of International Application No. PCT/CN2012/075114, filed May 7, 2012, which is hereby incorporated by reference.

TECHNICAL FIELD

The disclosure relates to wireless communication systems, and more particularly, to a base station (for example, eNB) and a method in relay node (RN) mobility.

BACKGROUND

Unless otherwise indicated herein, the approaches described in this section are not prior art to the claims in this application and are not admitted to be prior art by inclusion in this section.

Relay node (RN) is a kind of entity which exists between DeNB and UE. The architecture for a relay node has been proposed in Reference [1] (3GPP TS 36.806 V9.0.0, March, 2010).

Because high speed public transportation is being deployed worldwide at an increased pace, the requirement for Mobile Relay is more and more eager, for example, referring to Reference [2] (RP-110894, 3GPP TSG RAN#52, May 31-Jun. 3, 2011).

According to definition for mobile relay in Reference [2], one of mobile relay's major characters is the capacity to support group mobility. The reason to support group mobility is that excessive handover signaling can be avoided by performing a group mobility procedure instead of individual mobility procedures for every UE, so handover success rate can be improved via mobile relays capable of group mobility.

One group mobility procedure in LTE system may include the following phases:
1. Trigger of handover
   a. Terminal (or relay node) send Measurement Report to base station (for example, eNB);
2. Preparation of handover
   a. Signaling messages are exchanged between source base station and target base station via X2/S1 interface (for S1 handover, core network are also involved in preparation phase);
   b. New UE context for each terminal is created in target base station based on the exchanged signaling messages;
3. Execution of handover
   a. Radio interface for each terminal is reconfigured so that to align UE's radio configuration with target base station's radio configuration, wherein the radio configuration includes at least one of the following:
      i. New measurement configuration in target base station;
      ii. Mobility control information;
      iii. UE dedicated Radio resource configuration;
      iv. Security configuration;
   b. Each terminal triggers random access and achieves uplink synchronization with new serving base station (in group mobility, from the point of UE, new serving base station is still the relay node);
   c. Radio network changes backhaul transmission for the UE from source base station to target base station.

After mobile relay is introduced, each LTE terminal held by passengers on one vehicle (e.g., one high speed train) is connected with the mobile relay node mounted on the vehicle, and the mobile relay node in turn relays the communications between each individual terminal and on-land base station. When the vehicle moves across edge of two macro cells, the mobile relay node's backhaul radio link will change from source DeNB to target DeNB, but each UE on the vehicle still connects with the relay cell served by the mobile relay node. So during the group mobility (i.e., Relay Node mobility), for the following reasons, it is not very necessary to reconfigure radio interface configuration for each individual UE connected with the relay node on the vehicle:
1. LTE supports detected cells, so it is not necessary to list all cells need to be monitored within one measurement object. So during relay node handover (group mobility), measurement configuration for each UE does not need to be changed;
2. After relay node mobility, UE is still connected with the relay cell served by the mobile relay node, so it is not needed to send UE dedicated Radio resource configuration/Mobility Control Information to UE.

The sole radio configuration that needs be synchronized between UE and DeNB is security configuration. Because the value range of NCC (Next Hop Chaining Counter) is limited, from 0 to 7, if mobile relay node always ignores sending the securityConfigHO to UE during Relay Node handover, then after the $8^{th}$ inter-eNB Relay Node handover, the value of the NCC maintained in DeNB will round up, thus DeNB and UE cannot maintain synchronized (NH, NCC) pair (cf referring to Reference [3] (3GPP TS 33.401, V11.3.0, March 2012)). When the UE wants to handover from Relay Node to another eNB, there will be integrity protection failure for the un-synchronized (NH, NCC) pair between UE and network (cf referring to Reference [4] (3GPP TS 36.331 V9.10.0, March, 2012)).

But on the other hand, it is not necessary to synchronize the security key between UE and mobile relay node for every Relay Node handover. Because during Relay Node mobility procedure, actually the serving cell for the UE associated with the Relay Node does not change, so the security key ($K_{eNB}$) stored in UE and mobile relay node is still synchronized. According to Reference [4], transmitting securityConfigHO to UE need one intra-eNB handover, which will cause a lot of RRC Reconfiguration messages transmitted in Uu interface, and a lot of unnecessary random access in Un port during Relay Node mobility. In the high speed public transportation scenario, one Relay Node installed on one high speed train may support more than 600 UEs (if every passenger of the train holds one LTE terminal), and the time interval between two times of relay node handover is about 5-18 seconds. If relay node needs trigger intra-eNB handover for every terminal during each relay node handover procedure, then the signaling cost over Uu interface for relay node handover will be too big, and that will impact the throughput of the relay node.

SUMMARY

A base station and a method in relay node mobility are proposed in the present disclosure to decrease the frequency of security key synchronization between UE and DeNB, and at the same time, to guarantee that (NH, NCC) pair is always synchronized between UE and on-land radio network.

In this invention, for each UE associated with mobile relay, the DeNB maintains two variables, latest NCC and NCC in use, wherein the latest NCC denotes the NCC corresponding to the last NH (Next Hop) received from EPC for the specific UE, and NCC in use denotes the NCC corresponds to the NH (Next Hop) which is used to derive the security key ($K_{eNB}$) currently used in Un interface.

Only if the delta between latest NCC ($NCC_{latest}$) and NCC in use ($NCC_{in\_use}$) is larger than one pre-configured threshold, DeNB triggers one procedure to update security keys ($K_{eNB}$, $K_{UPenc}$, $K_{RRCint}$, and $K_{RRCenc}$) used by UE and mobile relay node in Un interface.

To facilitate the execution of the security key update, two new S1AP messages over Un port between DeNB and Relay Node may be introduced:

S1AP Security Key Update Request (containing $K_{eNB}^*$ and NCC); and

S1AP Security Key Update Response.

In a first embodiment of the present disclosure, there is provided a base station (for example, eNB) comprising: a first transceiver configured to receive a Next Hop Chaining Counter in use, $NCC_{in\_use}$, sent from a source base station; a synchronization determining unit configured to determine that a security key synchronization criteria as follows is met: $NCC_{latest}-NCC_{in\_use}>$Threshold, wherein $NCC_{latest}$ denotes a Next Hop Chaining Counter corresponding to the last Next Hop (NH) received from evolved packet core (EPC) for the UE, and Threshold is a predetermined threshold; a second transceiver configured to send a security key update request to a relay node serving the UE, and to receive a security key update response from the relay node serving the UE; and a security key updater configured to update the $NCC_{in\_use}$ as the $NCC_{latest}$.

In a second embodiment of the present disclosure, there is provided a method for security key synchronization comprising: for each user equipment (UE) served by a target base station, receiving a Next Hop Chaining Counter in use, $NCC_{in\_use}$, sent from a source base station; determining that a security key synchronization criteria as follows is met: $NCC_{latest}-NCC_{in\_use}>$Threshold, wherein $NCC_{latest}$ denotes a Next Hop Chaining Counter corresponding to the last Next Hop (NH) received from EPC for the UE, and Threshold is a predetermined threshold; sending a security key update request to a relay node serving the UE; receiving a security key update response from the relay node serving the UE; and updating the $NCC_{in\_use}$ as the $NCC_{latest}$.

The embodiments of the present disclosure provide at least one of the following benefits and advantages:

The security key update frequency between target DeNB and UE during the Relay Node handover procedure can be reduced by 87.5% (7/8) at most, which means only one time of intra-eNB handover need to be conducted for one UE associated with the relay node in 8 times of continuous RN handover;

Reduced transmission frequency of RRC Reconfiguration messages, carrying Information Element securityConfigHO, can avoid unnecessary signaling overhead in Un interface, which may be helpful to increase Un port throughput; and Reduced transmission frequency of RRC Reconfiguration messages, carrying Information Element securityConfigHO, can avoid unnecessary random access in Un interface, which may be helpful to increase Un port throughput.

At the same time, the S1AP Security Key Update Procedure can guarantee that the security key pair between UE and DeNB will not be out of synchronization.

DeNB can decide the time to schedule the security key update for each UE, which can avoid the rush of sending securityConfigHO to each UE when relay node moves across the edge of donor cells.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Figure 1:
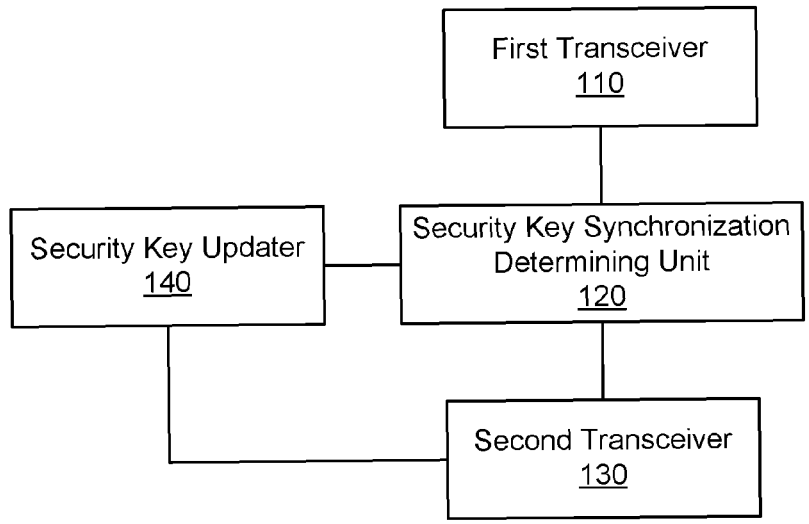
FIG. 1 shows a block diagram of a DeNB 100 according to the present disclosure.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

The present disclosure is exemplified in the context of inter-eNB RN handover (including intra-MME inter-eNB RN handover and inter-MME RN handover) in the scenario of LTE system.

FIG. 1 shows a block diagram of a DeNB 100 according to the present disclosure.

DeNB 100 may function as a target eNB to which the Relay Node (UE) to be handed over. As shown in FIG. 1, DeNB 100 may include a first transceiver 110, a security key synchronization determining unit 120, a second transceiver 130, and a security key updater 140.

The first transceiver 110 may be used to communicate with neighbor eNB or Core network (for example, MMEs, and so on). Inter alia, the first transceiver 110 may receive a Next Hop Chaining Counter in use, $NCC_{in\_use}$, sent from a source DeNB (not shown). In one embodiment, the $NCC_{in\_use}$ may be contained in an X2 Handover Request message sent from the source DeNB directly to the DeNB 100 (Intra-MME Handover). In this embodiment, the handover request message may further contain $K_{eNB}^*$ and NCC. As another embodiment, the $NCC_{in\_use}$ may be contained in a Handover Required message sent from the source DeNB to source MME, and this Information Element is forwarded (in Relocation Request and Handover Request) by source and target MMEs to the DeNB 100 (via S1 interface) (Inter-MME Handover). In this embodiment, the handover request message forwarded by the target MME to the DeNB 100 may further contain a Security Context, wherein Security Context may contain Next Hop Chaining Count and NH received from the source MME.

The security key synchronization determining unit 120 may be used to determine whether a security key synchronization criterion is met. For example, the security key synchronization criterion can be as follows:

$$NCC_{latest} - NCC_{in\_use} > Threshold,$$

wherein $NCC_{latest}$ denotes a Next Hop Chaining Counter corresponding to the last Next Hop (NH) received from evolved packet core (EPC) for the UE, and Threshold is a predetermined threshold in range of [1, 7].

The second transceiver 130 may be used to communicate with Relay Nodes (not shown). Inter alia, the second transceiver 130 may, when the security key synchronization criterion is met, send an S1AP Security Key Update Request to a Relay Node serving the UE, and to receive an S1AP Security Key Update Response from the Relay Node serving the UE.

On receipt of this S1AP Security Key Update Response message, the security key updater 140 may update the $NCC_{in\_use}$ as the $NCC_{latest}$.

Figure 2:
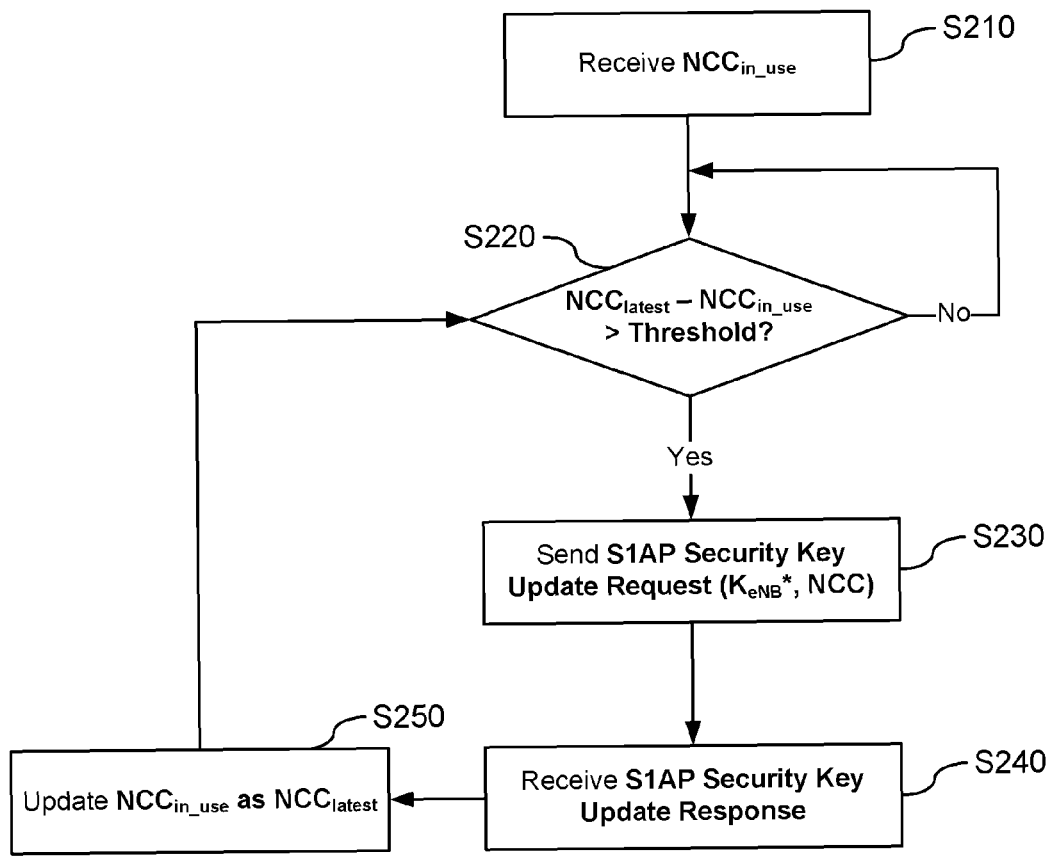
FIG. 2 shows a flowchart of a method for security key synchronization performed by the DeNB 100 according to the present disclosure.

FIG. 2 shows a flowchart of a method for security key synchronization performed by the DeNB 100 according to the present disclosure.

As shown in FIG. 2, the method for security key synchronization may include at least one of steps S210, S220, S230, S240 and S250.

In step S210, for each user equipment (UE) served by DeNB 100, a Next Hop Chaining Counter in use, $NCC_{in\_use}$, sent from a source base station is received by the first transceiver 110. In one embodiment, the $NCC_{in\_use}$ may be contained in an X2 Handover Request message sent from the source DeNB directly to the DeNB 100 (Intra-MME Handover). In this embodiment, the handover request message may further contain $K_{eNB}^*$ and NCC. As another embodiment, the $NCC_{in\_use}$ may be contained in a Handover Required message sent from the source DeNB to source MME, and this Information Element is forwarded (in Relocation Request and Handover Request) by source and target MMEs to the DeNB 100 (via S1 interface) (Inter-MME Handover). In this embodiment, the handover request message forwarded by the target MME to the DeNB 100 may further contain a Security Context, wherein Security Context may contain Next Hop Chaining Count and NH received from the source MME.

Following step S210, it is judged by the security key synchronization determining unit 120 in step S220 whether a security key synchronization criterion is met. For example, the security key synchronization criterion can be as follows:

$$NCC_{latest} - NCC_{in\_use} > Threshold,$$

wherein $NCC_{latest}$ denotes a Next Hop Chaining Counter corresponding to the last Next Hop (NH) received from evolved packet core (EPC) for the UE, and Threshold is a predetermined threshold in range of [1, 7].

If the security key synchronization criterion is not met (S220: No), then security key synchronization is not necessary for the UE, and the procedure returns to step S220 with or without time delay, for next round judgment.

On the other hand, if the security key synchronization criterion is met (S220: Yes), then security key synchronization is necessary for the UE, and the procedure goes to step S230. In the step S230, an S1AP Security Key Update Request is sent by the second transceiver 130 to a Relay Node serving the UE. On receipt of this S1AP Security Key Update Request, the Relay Node serving the UE may conducts an intra-BS handover procedure to synchronize (NH, NCC) pair with the UE, for example, by sends an RRC Reconfiguration message containing SecurityConfigHO to the UE. After RRC Reconfiguration Complete is received from UE, Relay Node responds to DeNB 100 with an S1AP Security Key Update Response message.

Step S240 follows the step S230. In the step S240, the S1AP Security Key Update Response is received by the second transceiver 130 from the Relay Node serving the UE.

In Step S250, the $NCC_{in\_use}$ is updated by the security key updater 140 as the $NCC_{latest}$, and the procedure returns to the step S220 for next round judgment.

Intra-MME Inter-eNB RN Handover

Figure 3:
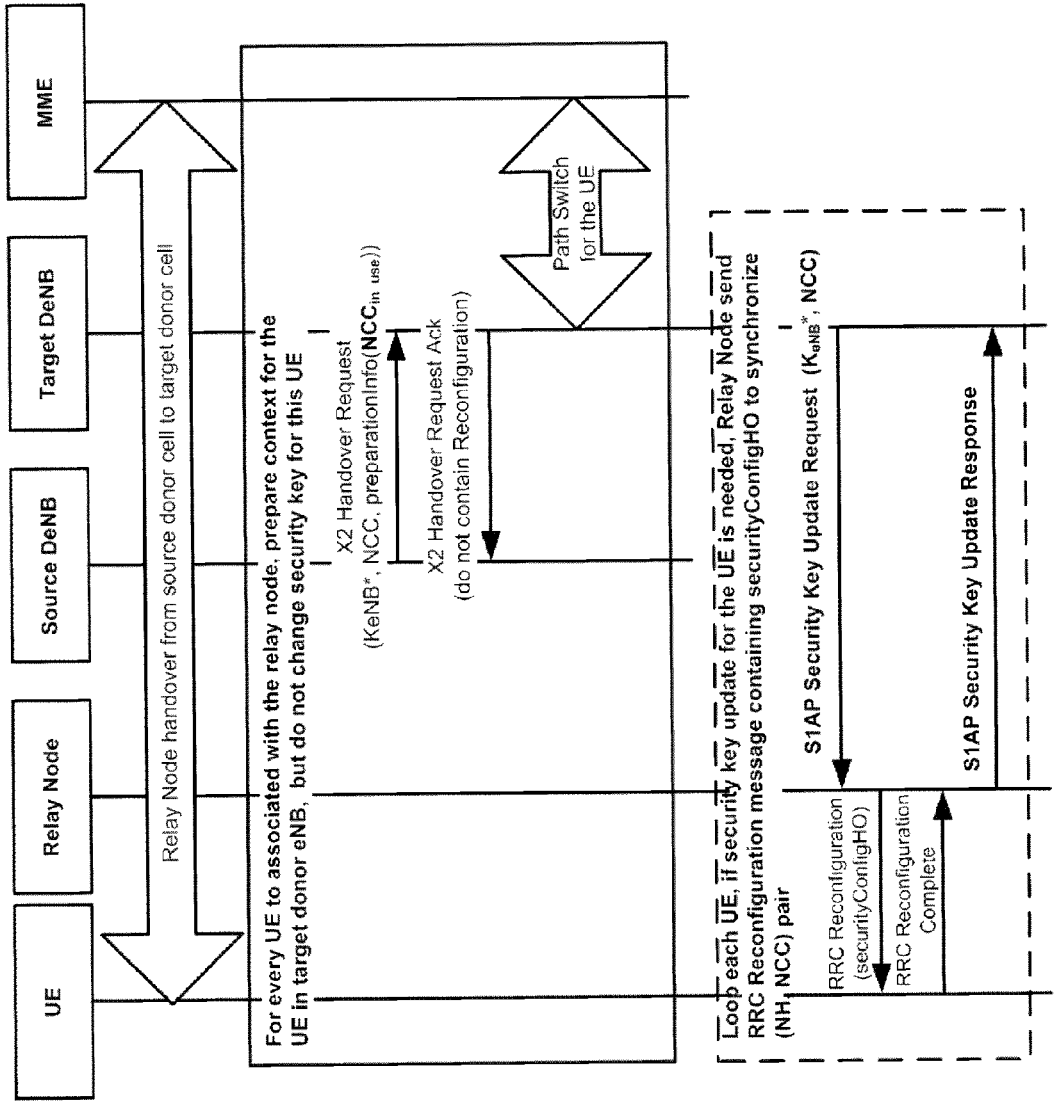
FIG. 3 shows a Sequence Diagram of Intra-MME Inter-eNB RN Handover Procedure (via X2)

FIG. 3 shows a Sequence Diagram of Intra-MME Inter-eNB RN Handover Procedure (via X2).

One example intra-MME Relay Node mobility procedure may include the following operations.

Relay Node detects radio environment degrades in source donor cell, and ask to create new context in target DeNB. This operation is the same as current handover procedure defined by 3GPP, and is thus not detailed herein.

For every UE associated with the Relay Node, source DeNB builds one Handover Request message and sends the Handover Request message to target DeNB via X2 interface. Within HandoverPreparationInformation carried in the Handover Request Message, one new IE (NCC in use ($NCC_{in\_use}$)) is added, wherein the $NCC_{in\_use}$ is the NCC associated with the $K_{eNB}$ currently used by UE and Mobile Relay in Un interface. On receipt of the Handover Request, the target DeNB stores NCC in use ($NCC_{in\_use}$) in the corresponding UE Context. At the same time, the target DeNB also stores $K_{eNB}^*$ and NCC, for the purpose of possible intra-eNB handover from RN to this DeNB.

Target DeNB sends Handover Request Acknowledge message to source DeNB. But the Handover Request Acknowledge does not contain RRC Reconfiguration message (because no radio configuration and security configuration needs to be updated for the UE).

Path switch for the UE changes the End Point of the GTP-U tunnel of the UE from source DeNB to target DeNB. After path switch, the variable of latest NCC ($NCC_{latest}$) and last NH are updated according to Security Context::Next Hop Chaining Count and Security Context::Next-Hop NH in PATH SWITCH REQUEST ACKNOWLEDGE message from MME to target DeNB.

After all UE associated with the Relay Node have handover from source DeNB to target DeNB, path switch for Relay Node's user plane is conducted. After user plane path switch for Relay Node completed, the radio link of Relay Node in source cell is deleted. This operation is the same as the current handover procedure defined by 3GPP, and is thus not detailed herein.

Target DeNB checks whether it is necessary to synchronize security key pair with a UE. If security key synchronization is necessary for the UE, then target DeNB sends one S1AP Security Key Update Request message to trigger Relay Node relaying the UE to conduct intra-eNB handover for the UE. The S1AP Security Key Update Request message contains $K_{eNB}^*$ and NCC ($NCC_{latest}$), wherein $K_{eNB}^*$ is derived by the last NH stored in target DeNB, and the carried NCC is the latest NCC ($NCC_{latest}$) stored in target DeNB.

Relay Node sends RRC Reconfiguration Message containing securityConfigHO to UE to synchronize (NH, NCC) pair stored in UE. After RRC Reconfiguration Complete is received from UE, Relay Node responds to target DeNB with one S1AP Security Key Update Response message. On receipt of this response message, target eNB updates the NCC in use ($NCC_{in\_use}$) as the latest NCC ($NCC_{latest}$).

One example criterion for target DeNB to determine whether it is necessary to synchronize security key pair can be $NCC_{latest} - NCC_{in\_use} >$ Threshold.

The threshold is one pre-configured value in range of [1, 7].

The intra-eNB handover is already supported by current LTE, for example, referring to §5.3.5.4 of Reference [4] (3GPP TS 36.331 V9.10.0, March, 2012)).

Inter-MME RN Handover

Figure 4:
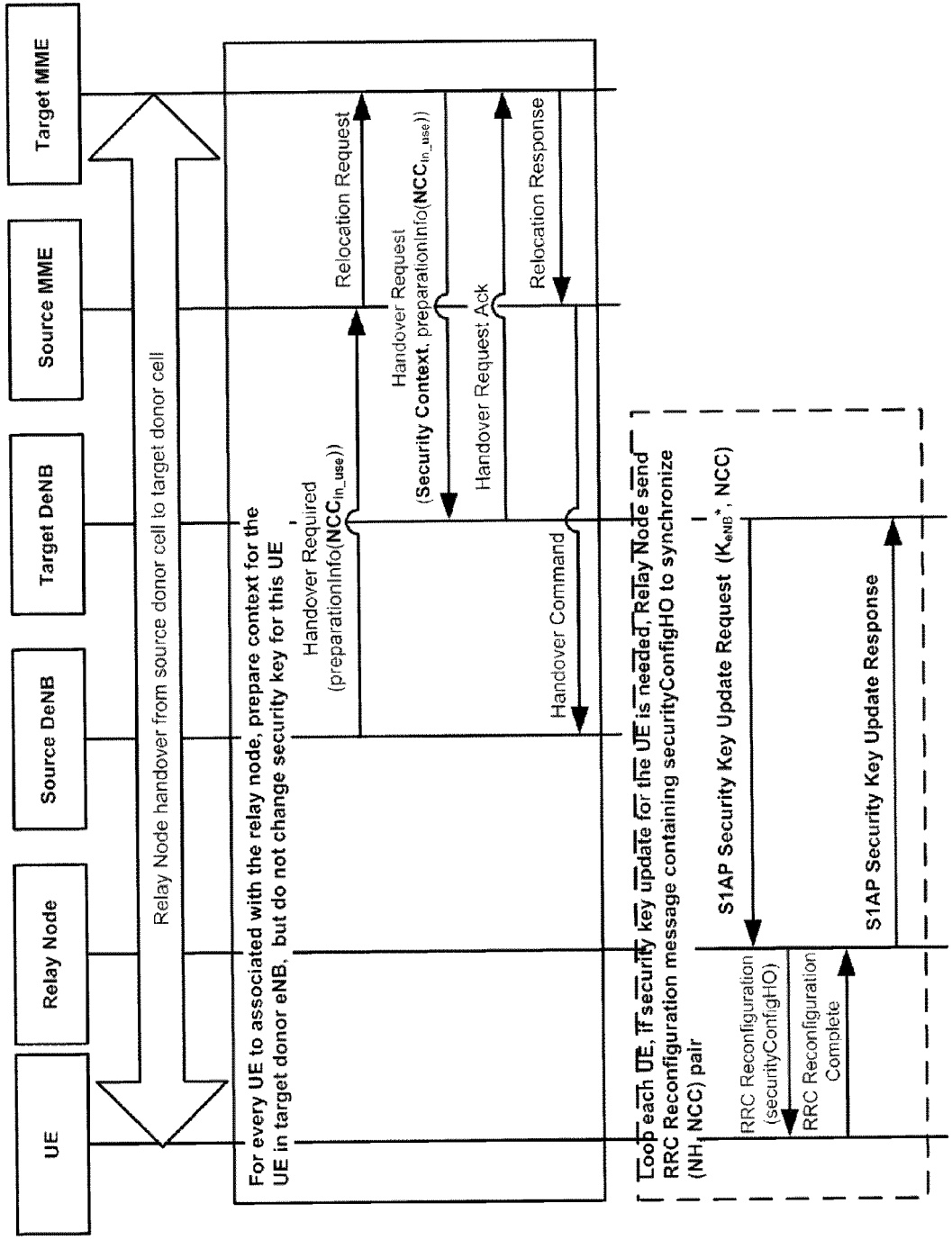
FIG. 4 shows a Sequence Diagram of Inter-MME RN Handover Procedure (via S1).

FIG. 4 shows a Sequence Diagram of Inter-MME RN Handover Procedure (via S1).

One example inter-MME Relay Node mobility procedure may include the following operations.

Relay Node detects radio environment degrades in source donor cell, and ask to create new context in target DeNB. This operation is the same as current handover procedure defined by 3GPP, and is thus not detailed herein.

For every UE associated with the Relay Node, source DeNB builds one Handover Required message and sends the Handover Required message to target DeNB via source MME and target MME (S1 interface). Within HandoverPreparationInformation carried in the Handover Required Message, one new IE (NCC in use ($NCC_{in\_use}$)) is added, wherein the $NCC_{in\_use}$ is the NCC associated with the $K_{eNB}$ currently used by UE and Mobile Relay in Un interface. On receipt of the Handover Request, the target DeNB stores NCC in use ($NCC_{in\_use}$) in the corresponding UE Context. The variable of latest NCC ($NCC_{latest}$) and last NH are updated for the UE Context according to Security Context::Next Hop Chaining Count and Security Context::Next-Hop NH in HANDOVER REQUEST message from target MME to target DeNB.

Target DeNB sends Handover Request Acknowledge message to target MME; target MME forwards Relocation Response message to source MME; and source MME sends Handover Command to source DeNB. The Handover Request Acknowledge and Handover Command message do not contain RRC Reconfiguration message (because no radio configuration and security configuration needs to be updated for the UE).

After all UE associated with the Relay Node have handover from source DeNB to target DeNB, the radio link of Relay Node in source cell is deleted. This operation is the same as the current handover procedure defined by 3GPP, and is thus not detailed herein.

Target DeNB checks whether it is necessary to synchronize security key pair with a UE. If security key synchronization is necessary for the UE, then target DeNB sends one S1AP Security Key Update Request message to trigger Relay Node relaying the UE to conduct intra-eNB handover for the UE. The S1AP Security Key Update Request message contains $K_{eNB}*$ and NCC ($NCC_{latest}$), wherein $K_{eNB}*$ is derived by the last NH stored in target DeNB, and the carried NCC is the latest NCC ($NCC_{latest}$) stored in target DeNB.

Relay Node sends RRC Reconfiguration Message containing securityConfigHO to UE to synchronize (NH, NCC) pair stored in UE. After RRC Reconfiguration Complete is received from UE, Relay Node responds to target DeNB with one S1AP Security Key Update Response message. On receipt of this response message, target eNB updates the NCC in use ($NCC_{in\_use}$) as the latest NCC ($NCC_{latest}$).

One example criterion for target DeNB to determine whether it is necessary to synchronize security key pair can be $NCC_{latest} - NCC_{in\_use} >$ Threshold.

The threshold is one pre-configured value in range of [1, 7].

The intra-eNB handover is already supported by current LTE, for example, referring to §5.3.5.4 of Reference [4] (3GPP TS 36.331 V9.10.0, March, 2012)).

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

3GPP 3$^{rd}$ Generation Partnership Project
BS Base Station
DeNB Donor eNB
EPC Evolved Packet Core
eNB evolved-UTRAN Node B
GTP-U GPRS Tunneling Protocol User Plane
IE Information Element
$K_{eNB}$ see §6.2 of TS 33.401
$K_{eNB}*$ see §6.2 of TS 33.401
$K_{UPenc}$ see §6.2 of TS 33.401
$K_{RRcint}$ see §6.2 of TS 33.401
$K_{RRCenc}$ see §6.2 of TS 33.401
LTE Long Term Evolution
MME Mobility Management Entity
NCC Next Hop Chaining Counter
NH Next Hop
RN Relay Node
S1AP S1 Application Protocol
UE User Equipment

REFERENCES

[1] 3GPP TS 36.806 V9.0.0, March, 2010;
[2] RP-110894, 3GPP TSG RAN#52, May 31-Jun. 3, 2011;
[3] 3GPP TS 33.401, V11.3.0, March 2012; and
[4] 3GPP TS 36.331, V9.10.0, March, 2012.

What is claimed is:

1. A base station, comprising:
a first transceiver configured to receive a Next Hop Chaining Counter in use, $NCC_{in\_use}$, sent from a source base station;
a security key synchronization determining unit configured to determine that a security key synchronization criteria as follows is met:

$NCC_{latest} - NCC_{in\_use} >$ Threshold, wherein $NCC_{latest}$ denotes a Next Hop Chaining Counter corresponding to a last Next Hop (NH) received from an evolved packet core (EPC) for a User Equipment (UE), and Threshold is a predetermined threshold;
a second transceiver configured to send a security key update request to a relay node serving the UE, and to receive a security key update response from the relay node serving the UE; and a security key updater configured to update the $NCC_{in\_use}$ as the $NCC_{latest}$.

2. The base station of claim 1, wherein the $NCC_{in\_use}$ is contained in a handover request message sent from the source base station directly to the base station.

3. The base station of claim 1, wherein the $NCC_{in\_use}$ is contained in a handover request message sent from the source base station and forwarded by source and target Mobility Management Entities (MMEs) to the base station.

4. A method for security key synchronization, comprising:
for each user equipment (UE) served by a target base station,
receiving a Next Hop Chaining Counter in use, $NCC_{in\_use}$, sent from a source base station;
determining that a security key synchronization criteria as follows is met:

$$NCC_{latest} - NCC_{in\_use} > \text{Threshold},$$

wherein $NCC_{latest}$ denotes a Next Hop Chaining Counter corresponding to the last Next Hop (NH) received from an evolved packet core (EPC) for a User Equipment (UE), and Threshold is a predetermined threshold;
sending a security key update request to a relay node serving the UE;
receiving a security key update response from the relay node serving the UE; and
updating the $NCC_{in\_use}$ as the $NCC_{latest}$.

5. The method for security key synchronization of claim 4, wherein the $NCC_{in\_use}$ is contained in a handover request message sent from the source base station directly to the target base station.

6. The method for security key synchronization of claim 4, wherein the $NCC_{in\_use}$ is contained in a handover request message sent from the source base station and forwarded by source and target Mobility Management Entities (MMEs) to the target base station.

7. The method for security key synchronization of claim 4, further comprising:
after receiving the security key update request, the relay node serving the UE conducts an intra-Base Station (BSS handover procedure to synchronize (NH, NCC) pair with the UE.

8. The method for security key synchronization of claim 7, wherein the relay node serving the UE sends an Radio Resource Control (RRC) Reconfiguration message containing SecurityConfigHO to the UE to synchronize (NH, NCC) pair with the UE.

* * * * *